United States Patent [19]

Witt

[11] 3,855,299

[45] Dec. 17, 1974

[54] WATER SOLUBLE REACTION PRODUCT OF EPIHALOHYDRIN AND ALKYLAMINES

[75] Inventor: Edward Witt, Framingham, Mass.

[73] Assignee: W. R. Grace & Co., New York, N.Y.

[22] Filed: June 11, 1973

[21] Appl. No.: 368,968

[52] U.S. Cl. ......... 260/584 R, 260/584 B, 252/358, 252/363.5
[51] Int. Cl. ............................................. C07c 91/02
[58] Field of Search .................... 260/584 R, 584 B

[56] References Cited
UNITED STATES PATENTS

| | | | |
|---|---|---|---|
| 3,063,790 | 11/1972 | Pollitzer | 260/584 R |
| 3,031,504 | 4/1962 | Pollitzer | 260/584 R |
| 3,217,018 | 11/1965 | Pollitzer | 260/584 B |

*Primary Examiner*—Lewis Gotts
*Assistant Examiner*—D. R. Phillips
*Attorney, Agent, or Firm*—Elton Fisher; Kenneth E. Prince

[57] ABSTRACT

A water soluble reaction product is prepared by reacting an aqueous mixture of a major amount of a secondary alkylamine and a minor amount of a primary alkylamine with an epihalohydrin.

11 Claims, No Drawings

WATER SOLUBLE REACTION PRODUCT OF EPIHALOHYDRIN AND ALKYLAMINES

BACKGROUND OF THE INVENTION

This invention is directed to a water soluble reaction product formed by reacting an epihalohydrin with an aqueous mixture of major amount of a secondary alkylamine and a minor amount of a primary alkylamine.

Reactions between an epihalohydrin and certain amines are taught by the following US Patents:
U.S. Pat. No. 3,663,461 (Witt, 260/2BP)
U.S. Pat. No. 3,497,556 (Lanner, et al., 260/584)
U.S. Pat. No. 3,642,663 (Greer, 252/500)
U.S. Pat. No. 3,248,352 (Coscia, 260/29.2)

SUMMARY OF THE INVENTION

In summary this invention is directed to a water soluble reaction product of an epihalohydrin, a major amount of a secondary alkylamine having 2–12 (preferably 2–8) carbon atoms and at least 1 (preferably 1–6) secondary amino groups per molecule, and a minor amount of a primary alkylamine having 1–25 (preferably 4–12) carbon atoms and at least 1 (preferably 1–6) primary amino groups per molecule, said reaction product being prepared by admixing the primary alkylamine and the secondary alkylamine in an aqueous medium and adding the epihalohydrin thereto while maintaining the temperature of the resulting reacting mixture at 25°–125°C (preferably at 35°–100°C) until its viscosity (the viscosity of the reacting mixture) reaches a predetermined value (generally 20–20,000 and preferably 20–10,000 centipoises). If desired acid can be added when the predetermined visocsity has been reached to lower the pH and to terminate reaction. If acid is not added the product generally has a pH of about 5–8 depending on such factors as; (a) the ratio of reactants used; (b) whether or not caustic was added during reaction; and (c) the amount of water present in the solution. The viscosity of the final product will vary depending on the average molecular weight of the reaction product in the resulting solution and on the ratio of such product to the water component of said resulting solution. A pH within the range of 1–7.5 (preferably 2–6.5) is generally preferred in the final, or end, product (final solution).

DESCRIPTION OF PREFERRED EMBODIMENTS

In preferred embodiments of the composition of the above Summary:
1. The epihalohydrin is epichlorohydrin or epibromohydrin.
2. The secondary alkylamine is dimethylamine.
3. The primary alkylamine is dimethylaminopropylamine.
4. The equivalent ratio of epihalohydrin to primary alkylamine is 1:0.009–0.5 (preferably 1:0.02–0.5).
5. The equivalent ratio of epihalohydrin to secondary alkylamine plus primary alkylamine is 1:0.22–1.3 (preferably 1:0.25–1).
6. The mole ratio of secondary alkylamine to water is 1:1–100 (preferably 1:2–50).
7. The epihalohydrin is epichlorohydrin, the secondary alkylamine is dimethylamine, and the primary alkylamine is dimethylaminopropylamine, the equivalent ratio of epichlorohydrin to dimethylamine is 1:0.45 and the equivalent ratio of epichlorohydrin to dimethylaminopropylamine is 1:0.091.

DETAILED DESCRIPTION OF THE INVENTION

The water soluble reaction product of this invention has been used with excellent results to coagulate anionic latexes, to flocculate kaolin clay dispersions, and to break oil-in-water and water-in-oil emulsions. A technique for breaking oil-in-water and water-in-oil emulsions with said reaction product is described in U.S. Pat. application Ser. No. 345,775, filed Mar. 28, 1973 which is assigned to W. R. Grace and Co.

The instant invention will be better understood by referring to the following specifica but nonlimiting examples. It is understood that this invention is not limited by the examples which are offered merely as illustrations; it is also understood that modifications, including the substitution of an equivalent material for any reactant, can be made without departing from the spirit and scope of the invention.

EXAMPLE 1

The water soluble reaction product of this invention was prepared by the following procedure:

A 10.2 gram (0.1 mole or 0.2 equivalents) portion of dimethylaminopropylamine and a 112.5 g portion of an aqueous 40% dimethylamine solution (1 mole, i.e., 1 equivalent of dimethylamine) were admixed in a 500 ml glass reaction zone provided with a thermometer, a condenser, and an addition funnel. The mixture in the reaction zone was cooled to 25°–30°C and 102 g (1.1 mole or 2.2 equivalents) of epichlorohydrin was added to the reaction zone over a period of about 10–15 minutes while stirring the resulting mixture in the reaction zone and while maintaining said mixture within a temperature range of 30°–35°C by cooling said mixture. Cooling was necessary because the reaction between the epichlorohydrin and the amines was exothermic. After all of the epichlorohydrin had been added the exotherm subsided and the material in the reaction zone was heated to 60°–65°C and maintained within this temperature range while stirring and adding 300 ml of water thereto at a rate of 65 ml per hour. After all of the water had been added the resulting mixture was stirred for another 2 hours while maintaining the temperature thereof at 60°–65°C. The resulting mixture was then cooled to 25°C and a first sample was taken for testing. The pH of the first sample was found to be 6.3 and its viscosity was found to be 75 centiposes. Said sample had a solid content of 31.4%.

After standing for 3 days at room temperature (ca. 22°–28°C) the viscosity of the resulting mixture had increased to 150. Accordingly, dilute (6 normal) sulfuric acid solution was added thereto to bring the pH to 3.2 to terminate further reaction and stabilize the product. The thus stabilized product (which contained 69% water) was designated "Product No. 1."

EXAMPLE 2

The general procedure of Example 1 was repeated. However in this instance the dimethylamine solution was replaced with an equivalent amount (1 mole, i.e., 1 equivalent) of diethylamine which was dissolved in water to form an aqueous 40% diethylamine solution before adding it (the diethylamine) to the reaction zone. The resulting product, after having its pH adjusted to 3.1 was designated "Product No. 2."

Both Product No. 1 and Product No. 2 were tested as emulsion breakers for; (a) water-in-crude oil emulsions; and (b) crude oil-in-water emulsions and excellent results were obtained in each test.

Because of my disclosure, it will be readily apparent to those skilled in the art that secondary alkylenepolyamines having 3–50 (preferably 3–28) carbon atoms and at least 1 (preferably 2–15) secondary amino groups per molecule are equivalent to and can be substituted for the secondary alkylamine recited in the above Summary. Such substitution is made on a 1 for 1 basis (i.e., by substituting one equivalent, as defined infra, of the secondary alkylenepolyamine for one equivalent of said secondary alkylamine).

Because of my disclosure it will be readily apparent to those skilled in the art that primary alkylenepolyamines having 4–25 (preferably 4–12) carbon atoms and at least 1 (preferably 1–6) primary amino groups per molecule are equivalent to and can be substituted for the primary alkylamine recited in the above Summary. Such substitution is made on a 1 for 1 basis (i.e., by substituting one equivalent, as defined infra, of the primary alkylenepolyamine for one equivalent of said primary alkylamine).

Because of my disclosure it will be readily apparent to those skilled in the art that ammonia is equivalent to and can be substituted for the primary alkylamine recited in the above Summary. Such substitution is made on a 1 for 1 basis (i.e., by substituting one equivalent, as defined infra, or ammonia for one equivalent of said primary amine).

Because of my disclosure it will be readily apparent to those skilled in the art that dihalohydrins (preferably dichlorohydrins and dibromohydrins) having 3–20 (preferably 3–10) carbon atoms per molecule are equivalent to and can be substituted for the epihalohydrin recited in the above Summary. Such substitution is made on a 1 for 1 basis (i.e., by substituting one equivalent, as defined infra, of dihalohydrin for one equivalent of said epihalohydrin).

As used herein the term "mole" has its generally accepted meaining—a mole of a substance being that quantity of the substance which contains the same number of molecules of the substance as there are carbon atoms in 12 g of pure $^{12}$C.

The functionality of each amine used in the present invention is equal to the number of reactive amino hydrogens per molecule thereof, that is, to the number of hydrogens which are attached to basic amino nitrogen atoms. Thus ethylenediamine has a functionality of 4, dimethylamine has a functionality of 1, dimethylaminopropylamine has a functionality of 2, ammonia has a functionality of 3, and a tertiary amino group has a functionality of zero.

The "equivalent weight" of an amine is the gram molecular weight of said amine divided by its functionality. Thus, an "equivalent" of ethylenediamine is ¼ mole of ethylenediamine, an "equivalent" of dimethylamine is 1 mole of dimethylamine, and an "equivalent" of dimethylaminopropylamine, $(CH_2)_2N-CH_2CH_2CH_2-NH_2$, is ½ mole of dimethylaminopropylamine, and an "equivalent" of ammonia is ⅓ mole of ammonia.

For the purpose of this invention amines such as dimethylaminopropylamine,

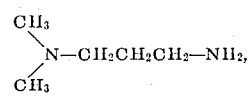

diethylaminobutylamine,

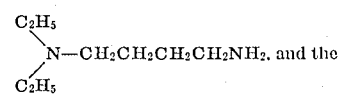

like are considered to be primary alkylamines even though they contain a tertiary amino group in addition to their primary amino group.

Epichlorohydrin has a functionality of 2; hence, an equivalent of epichlorohydrin is ½ mole of epichlorohydrin.

As used herein the term "dihalohydrin" means a dihalogen substituted alkanol in which one of the halogens (the "first halogen") is substituted for a hydrogen on a carbon atom adjacent to the carbon atom having the OH group attached thereto and the other halogen (the "second halogen") is substituted for a hydrogen on; (a) a carbon atom adjacent to the carbon atom having the first halogen attached thereto; or (b) a carbon atom adjacent to the carbon atom having the OH group attached thereto; however, both halogen atoms cannot be on the same carbon atom, and a halogen atom cannot be on the carbon atom to which the OH group is attached.

Typical dihalohydrins include but are not limited to:

$CH_2ClCHClCH_2OH$
$CH_2ClCH_2(OH)CH_2Cl$
$CH_3CHClCHClCH_2OH$
$CH_3CHClCH(OH)CH_2Cl$
$CH_3CH_2CHClCHClCH_2OH$
$CH_3CHClCHClCH(OH)CH_3$
$CH_3CH_2CHClCH(OH)Cl$
$CH_3CH_2CH(OH)CHClCH_2Cl$
$CH_3CHClCH(OH)CHClCH_3$

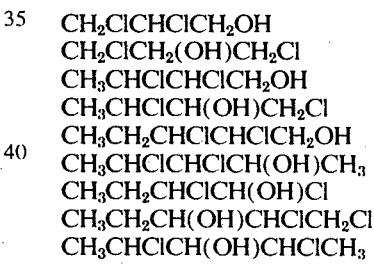

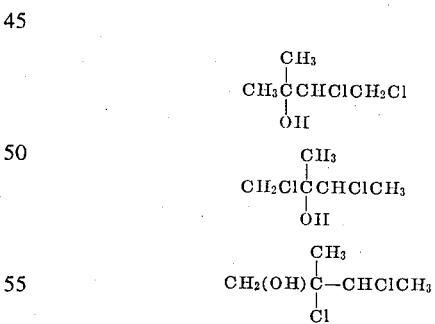

and the bromo analogs of the above-mentioned dichlorohydrins.

The functionality of the dihalohydrins is two; hence an equivalent of a dihalohydrin is one half mole of the dihalohydrin.

The functionality of epibromohydrin is 2; hence an equivalent of epibromohydrin is one half mole of the epibromohydrin.

Viscosity was determined at 25°C using a Brookfield Viscometer with a No. 2 spindle at 12 revolutions per minute.

pH was determined with a glass electrode type pH meter at 25°C.

The term "percent (%)" means parts per 100 and the term "parts" means parts by weight unless otherwise defined where used.

As used herein the terms "a major amount of a secondary alkylamine" and "a minor amount of a primary alkylamine" means that the equivalent ratio of epihalohydrin to primary alkylamine is 1:0.009–0.5 and the equivalent ratio of epihalohydrin to primary alkylamine plus secondary alkylamine is 1:0.22–1.3 with the equivalent ratio of secondary alkylamine to primary alkylamine always being greater than one.

As noted supra, it will be, because of my disclosure, readily apparent to those skilled in the art that secondary alkylenepolyamines are for the purpose of this invention equivalent to secondary alkylamines and can be substituted for said secondary alkylamines in preparing the composition of this invention.

Also as noted supra, primary alkylenepolyamines and ammonia are, for the purpose of this invention, equivalent to primary alkylamines and can be substituted for said primary alkylamines in preparing the composition of this invention.

Since the functionality of a tertiary amino group is zero, an equivalent of dimethylaminopropylamine is ½ mole of the dimethylaminopropylamine.

I claim:

1. A water soluble product prepared by: (a) admixing in an aqueous medium; (i) a member selected from a first group consisting dimethylamine and diethylamine; and (ii) a member selected from a second group consisting of dimethylaminopropylamine, dimethylaminobutylamine, and ammonia; (b) adding thereto a member selected from a third group consisting of epichlorohydrin, epibromohydrin,
   $CH_2ClCHClCH_2OH$,
   $CH_2ClCH_2(OH)CH_2Cl$,
   $CH_3CHClCHClCH_2OH$, and
   $CH_3CHClCH(OH)CH_2Cl$
while maintaining the temperature of the resulting reacting mixture at 25°–125°C., and (c) maintaining the temperature of the mixture at 25°–125°C until its viscosity reaches 20–20,000 centipoises, the equivalent ratio of third group member to second group member being 1:0.009–0.5, the equivalent ratio of third group member to first group member being 1:0.22–1.3, the equivalent ratio of first group member to second group member being greater than 1, and the mole ratio of first group member to water being 1:1–100.

2. The product of claim 1 in which the second group member is dimethylaminopropylamine.

3. The product of claim 1 in which the third group member is epichlorohydrin.

4. The product of claim 1 in which the third group member is $CH_2ClCHClCH_2OH$.

5. The product of claim 1 in which the pH of the mixture is adjusted to 1–7.5 to terminate reaction when the viscosity reaches 20–10,000 centipoises.

6. A water soluble product prepared by: (a) admixing in an aqueous medium; (i) a member selected from a first group consisting dimethylamine and diethylamine; and (ii) a member selected from a second group consisting of dimethylaminoprpylamine and dimethylaminobutylamine, and ammonia; (b) adding thereto a member selected from a third group consisting of epichlorohydrin and epibromohydrin, while maintaining the temperature of the resulting reacting mixture at 25°–125°C; and (c) maintaining the temperature of the mixture at 25°–125°C until its viscosity reaches 20–20,000 centipoises, the equivalent ratio of third group member to second group member being 1:0.009–0.5, the equivalent ratio of third group member to first group member being 1:0.22–1.3, the equivalent ratio of first group member to second group member being greater than 1, and the mole ratio of first group member to water being 1:1–100.

7. The product of claim 1 in which the first group member is dimethylamine, the second group member is dimethylaminopropylamine, and the third group member is epichlorohydrin.

8. The composition of claim 7 in which;
   a. the equivalent ratio epichlorohydrin to dimethylamine is 1:0.45; and
   b. the equivalent ratio of epichlorohydrin to dimethylaminopropylamine is 1:0.09.

9. The product of claim 7 in which the pH of the mixture is adjusted to 1–7.5 to terminate reaction when the viscosity reaches 2–20,000 centipoises.

10. The product of claim 9 in which the pH of the mixture is adjusted to 2–6.5 when the viscosity reaches 20–10,000 centipoises.

11. The process of claim 7 in which reacting mixture is maintained at 35°–100°C; (a) while adding the epichlorohydrin thereto; and (b) until the viscosity reaches 20–10,000 centipoises.

* * * * *

UNITED STATES PATENT AND TRADEMARK OFFICE
CERTIFICATE OF CORRECTION

PATENT NO. : 3,855,299
DATED : December 17, 1974
INVENTOR(S) : Edward Witt

It is certified that error appears in the above-identified patent and that said Letters Patent are hereby corrected as shown below:

In Claim 1, line 19, and in Claim 6, line 15, after the word "first" add -- plus second --.

Signed and Sealed this

*Twenty-fourth* Day of *October 1978*

[SEAL]

Attest:

RUTH C. MASON
*Attesting Officer*

DONALD W. BANNER
*Commissioner of Patents and Trademarks*